United States Patent [19]

Barlow

[11] Patent Number: 5,432,028
[45] Date of Patent: Jul. 11, 1995

[54] ELECTROLYTE CONTAINMENT BARRIER FOR BIPOLAR CELLS IN HIGH TEMPERATURE MOLTEN SALT BATTERIES

[75] Inventor: Geoffrey Barlow, South Russell, Ohio

[73] Assignee: Westinghouse Electric Corporation, Pittsburgh, Pa.

[21] Appl. No.: 137,330

[22] Filed: Oct. 18, 1993

[51] Int. Cl.$^6$ .............................................. H01M 2/08
[52] U.S. Cl. ..................................... 429/134; 429/135; 429/154; 429/171; 429/185; 429/210; 29/623.2
[58] Field of Search ............... 429/134, 135, 171, 185, 429/210, 154, ; 29/623.2

[56] References Cited

U.S. PATENT DOCUMENTS

| | | |
|---|---|---|
| 4,208,473 | 6/1980 | Bradley .............................. 429/112 |
| 4,326,016 | 5/1982 | Selover, Jr. et al. ............... 429/18 X |
| 4,381,597 | 5/1983 | Selover, Jr. et al. ............. 429/103 X |
| 5,162,172 | 11/1992 | Kaun . |
| 5,254,415 | 10/1983 | Williams et al. .................... 429/153 |

Primary Examiner—Stephen Kalafut
Assistant Examiner—M. Nuzzolillo

[57] ABSTRACT

An improved battery of the type formed of cells stacked in series. The positive and negative electrodes of each cell being separated by a separator and each cell being separated by a respective bipolar wall. A sleeve-like seal is provided around the periphery of each cell. The seal is preferably made of a nonwettable material that can be made in a flexible form, such as boron nitride. The barrier seal being in sealing contact with opposed planar faces of bipolar walls bounding each cell. The seal is preferably affixed to the bipolar walls by a paintable cement made of a mixture of boron nitride powder and a clay binder suspended in a nonaqueous organic vehicle.

15 Claims, 3 Drawing Sheets

ELECTROLYTE CONTAINMENT BARRIER FOR BIPOLAR CELLS IN HIGH TEMPERATURE MOLTEN SALT BATTERIES

BACKGROUND OF THE INVENTION

1. Field of the Invention

This invention relates to improvements in stacked multicell batteries, and more particularly to preventing ionically conductive paths from forming between adjacent cells and the battery case.

2. Description of the Prior Art

When constructing practical electrochemical cells in batteries there are two basic ways in which electrodes can be connected inside the cell or battery module case. These are series and parallel connections. In a bipolar battery design, the electrodes are hooked together in series, thus the voltage of the stack is n times that of a single cell, where n is equal to the number of cells in the stack. Each cell being comprised of a positive and a negative electrode separated from one another by some electronically insulative material.

To build a long life bipolar cell stack requires that there be no electrolyte path (i.e., no ionic leakage) formed between adjacent cells around the bipolar wall. This ensures that all of the current flow through the bipolar wall should be electronic in nature and there should be no ionic flow. Thus, the practical problem in building bipolar cell stacks is how to prevent liquid electrolyte paths from developing between adjacent cells. Because of the inability to completely contain the electrolyte within each cell, maximum performance and life of rechargeable bipolar batteries has not yet been realized to date.

Referring to FIG. 1 which shows a prior art cell stack, the positive and negative electrodes and separator of each cell contain an electrolyte which is liquid at the operating temperature. The bipolar wall shown in FIG. 1 separates adjacent cells and is designed to allow an electronic path between adjacent cells while not allowing an ionic path. If a path of electrolyte is allowed to travel around the bipolar wall, an ionic short develops reducing the effectiveness of the battery. When the liquid electrolyte contacts the bipolar wall, it may either wet or not wet the surface of the bipolar wall. When the liquid electrolyte runs across the surface of the bipolar wall, the wall is said to be wetted by the electrolyte. It is when the bipolar wall is wetted by the electrolyte that the electrolyte might travel in an undesirable path, shown in the figure, to the adjacent cell.

The ideal solution to the electrolyte leakage problem is to use a minimum amount of electrolyte which is completely contained within the individual electrodes and separator by capiliary forces. In practice, however, this is almost impossible since more than this minimum amount of electrolyte is required to obtain the desired electrochemical performance from the battery.

The critical component to make a bipolar battery feasible is the development of a reliable bipolar wall edge seal to prevent the migration of electrolyte between adjacent cells and from the cells to the module case wall. If electrolyte bridges across adjacent cells or to the conductive battery case, ionically conductive paths will be formed which will degrade the capacity of the effected cells and result in an imbalance in the cell stack and, ultimately, failure of the entire battery.

Others have attempted to solve this electrolyte containment problem by forming a hermetic seal around the perimeter of each cell thereby permanently isolating each cell from adjacent cells and from the battery case. This approach requires a sophisticated insulating material that can withstand the high operating temperatures and yet is capable of being bonded to metal between the cell hardware components. The insulating material must be capable of withstanding chemical, electrochemical, thermal and mechanical effects imposed by the cell stack under all operating and environmental conditions. The assembly of this type of seal will result in high fabricating costs and low reliability due to the large area which must be perfectly sealed. The mechanical loading on the ceramic ring caused by thermal expansion of the components during heating and cooling may limit this type of hermetic seal design to circular configurations in relatively small sizes (i.e., approximately five inches). This may impose severe packaging penalties and reduce the energy density for many potential battery applications. Therefore, alternative means are necessary to confine the electrolyte from migrating from the electrodes and separator around the bipolar wall.

SUMMARY OF THE INVENTION

I provide a flexible, nonwettable barrier seal for use in molten salt batteries utilizing series stacked cells. The barrier seal is capable of accommodating mechanical loading and thermal effects as well as volume changes in the cell due to electrochemical reactions in the cell.

Each cell of molten salt batteries typically has a positive electrode and a negative electrode that both contain an electrolyte and are separated from one another by a separator that allows ions to pass between the electrodes without allowing electrode material to pass between the electrodes. Each cell is separated from adjacent cells by a bipolar wall which is typically a good electronic conductor, such as a metal like molybdenum. Each cell, therefore, is bounded by opposed planar faces of first and second bipolar walls.

I provide a barrier seal around the periphery of each cell for limiting the migration electrolyte around the bipolar wall. The materials of construction are preferably non-wettable by the electrolyte. The barrier seal is also compliant to withstand dimensional changes in the battery. The barrier seal has a first end which is in contact with the planar face of the first bipolar wall. The barrier seal further has a second end which is in contact with the opposed planar face of the second bipolar wall.

Preferably, the barrier seal is made of boron nitride which is fashioned as a felt gasket. The barrier seal is preferably affixed to at least one of the opposed planar faces by a paintable cement. The paintable cement is preferably a mixture of boron nitride powder and a clay binder suspended in a nonaqueous organic vehicle.

Other objects and advantages of the invention will become apparent from a description of certain present preferred embodiments thereof shown in the drawings.

DETAILED DESCRIPTION OF THE PREFERRED EMBODIMENT

Figure 1:
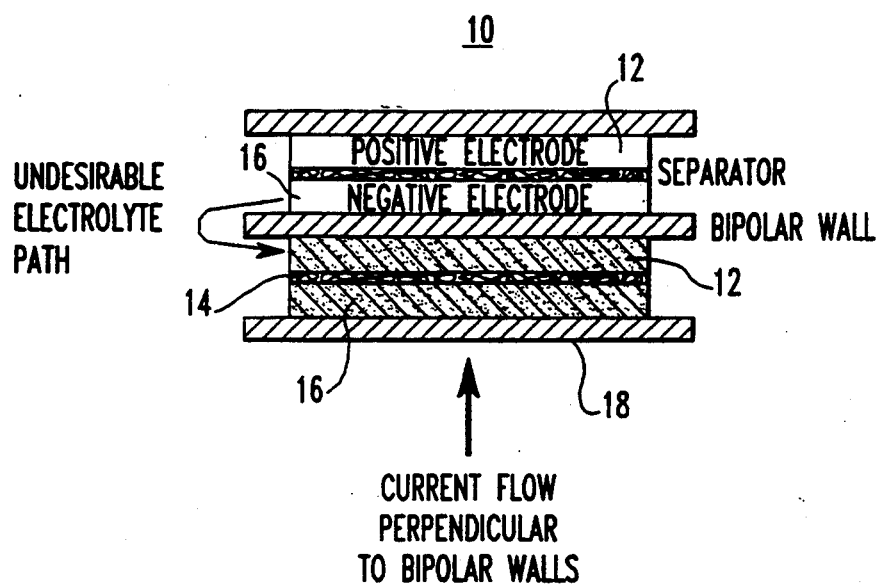
FIG. 1 is a schematic view of a prior art series stacked multicell battery.

A containment barrier is provided to prevent the migration of electrolyte (shown in FIG. 1) between bipolar cells of a high temperature lithium alloy/metal sulfide battery. In these types of batteries, the electrolyte is typically a combination of several molten alkali halide salts and is liquid at the operating temperature.

One of the few known materials that is not readily wetted by molten alkali halide salts is high purity boron nitride (i.e., boron nitride having low $B_2O_3$ content). Boron nitride can be readily manufactured in several different physical forms such as solid, bar or plate, fibers and cloth, felt or string, and powders. In the form of a felt, the boron nitride is sufficiently flexible to accommodate loading of the cell stack as well as volume changes of the cell. Therefore, boron nitride is the preferred material for the containment barrier although any material exhibiting the desired nonwetting and flexibility characteristics may be employed.

Figure 2A:
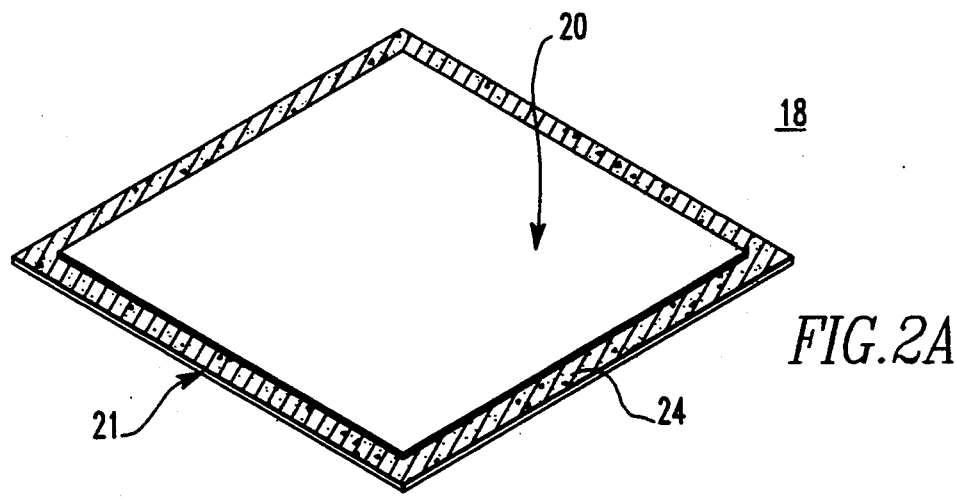
FIG. 2A is a perspective view of a bipolar wall showing a step in the formation of a preferred containment barrier.
Figure 2B:
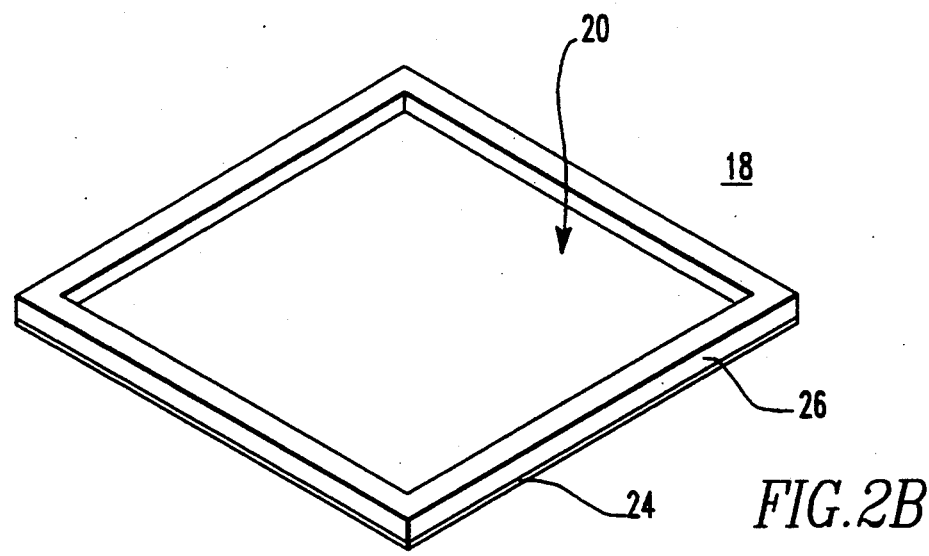
FIG. 2B is a perspective view of a bipolar wall showing a further step in the formation of a preferred containment barrier.

Referring first to FIGS. 2A and 2B, the preferred containment barrier is constructed for a lithium alloy/metal sulfide cell stack by placing a sleeve-like gasket 26 of barrier material onto the bipolar wall 18. Being sleeve-like, the gasket 26 has openings at opposed ends and has a length of material therebetween. Although the preferred gasket 26 is continuous, it is understood that the gasket 26 may be formed of two or more segments which are matingly joined to form the gasket 26. The preferred containment barrier seal will be described employing boron nitride prepared as a felt.

Although the gasket 26 may be placed between bipolar walls 18 and held in place by the compressive load placed on the cell stack during operation, the felt gasket 26 is preferably affixed to the bipolar wall 18. The preferred means of affixing the boron nitride felt gasket 26 to a face of the bipolar wall 18 involves applying a paintable cement 24 to the bipolar wall face and then placing the gasket 26 into contact with the cement 24.

As can be seen best in FIG. 2A, the paintable cement 24 is preferably not applied to the entire surface of the face 20 of the bipolar wall 18. Rather, the cement 24 is applied only to a distal edge 21 of the bipolar wall face 20. The distal edge 21 denotes a thin area on the face of the bipolar wall extending in a short distance from the edge of each of the bipolar wall sides.

Although the bipolar wall 18 may be configured in any shape, a square or rectangular shape (as shown in the figures) is typically found in the art. Thus, the application of the paintable cement 24 is preferably made along the rectangular distal edge 21 of the top face 20 of the bipolar wall 18 so that the cement 24 is placed on an area resembling a picture frame.

The boron nitride felt gasket 26 is also shaped as a rectangular picture frame corresponding to the painted cement. The felt gasket 26 is preferably thicker in its uncompressed state than the thickness of the bipolar cells 10 (i.e., positive electrode 12, negative electrode 16 and separator 14). In fact, the preferred uncompressed thickness of the felt gasket 26 is approximately twice the thickness of a bipolar cell 10. The felt gasket 26 has a larger uncompressed thickness than the cell so that it may act as a compliant gasket. The area on the bipolar wall face to be covered by the paintable cement and felt gasket will vary depending on the size of the cell. However, a typical range of dimensions of bipolar walls is from a 20 $cm^2$ area (circular) to a 300 $cm^2$ area (square or rectangular). Therefore, the cement and felt gasket will typically extend approximately 5 mm to 13 mm from each edge of the bipolar wall.

The paintable cement 24 is preferably a mixture of boron nitride powder and a clay binder suspended in a nonaqueous organic vehicle. To further restrict the migration of electrolyte around the bipolar wall 18, a "picture frame" coating of boron nitride cement 24 is also preferably applied to the bottom face 22 of the bipolar wall 18. Therefore, each felt gasket 26 is preferably affixed to each opposed bipolar wall face by the paintable cement 24.

After applying the picture frame of boron nitride cement 24 and adhering the compliant boron nitride felt frame 26 to the bipolar wall 18, the bipolar wall 18 and adhered felt gasket 26 are preferably heated to an elevated temperature of approximately 500° C. Heating the assembly ensures that all of the volatile materials likely to be evolved at the battery operating temperature are removed. Once this step is completed, the bipolar cell components 12, 14 and 16 can be installed within the cell assembly.

In constructing the battery, the bipolar elements or cells 10 are stacked one on top of each other in series to achieve the desired battery voltage. The containment barrier seal becomes fully effective when the assembled cell stack is compressively loaded so that the boron nitride felt gaskets 26 are compressed to the same thickness as the bipolar electrodes 12 and 16. There is sufficient resilience in the boron nitride felt 26, at the battery operating temperature of approximately 500° C., that even when the bipolar electrodes 12 and 16 grow in thickness, the felt barrier 26 expands to maintain contact with the adjacent bipolar wall 18.

Figure 3A:
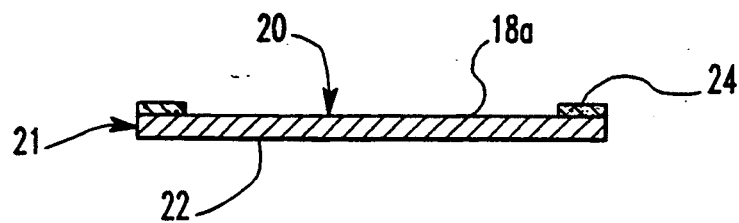
FIG. 3A is a cross sectional view taken in elevation of the first step of a first preferred method of forming the containment barrier as affixed to a stacked multicell battery.

A first preferred method of constructing the containment barrier is described with reference to FIGS. 3A through 3D. Referring first to FIG. 3A, a bipolar wall 18a has a top face 20 and a bottom face 22 that are exposed. The paintable cement 24 is applied to the distal edge 21 of the top face 20 of the bipolar wall 18a.

Figure 3B:
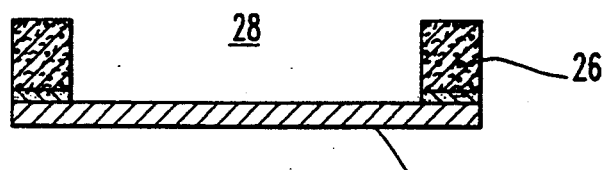
FIG. 3B is a cross sectional view taken in elevation of the second step of a first preferred method of forming the containment barrier as affixed to a stacked multicell battery.

Referring next to FIG. 3B, the boron nitride felt gasket 26 is positioned upon the cement 24 and is thus affixed to the top surface 20 of the bipolar wall 18a. A cell cavity 28 is thus formed that is bounded by the bipolar wall 18a and the felt gasket 26. The structure shown in FIG. 3B (the felt gasket 26 adhered by cement 24 to bipolar wall 18) may then be heated to remove volatile materials.

Figure 3C:
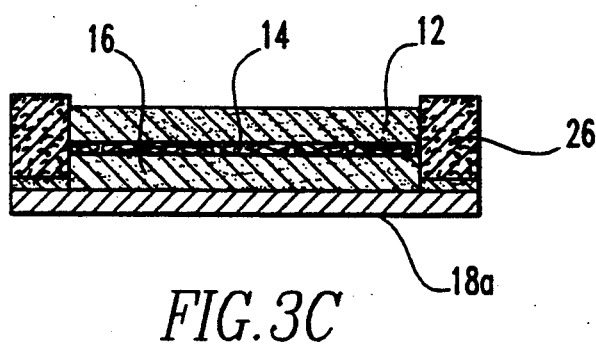
FIG. 3C is a cross sectional view taken in elevation of the third step of a first preferred method of forming the containment barrier as affixed to a stacked multicell battery.

Referring next to FIG. 3C, the cell components are positioned into place within the cell cavity 28. The negative electrode 16 is first placed within the cell cavity 28 upon the top surface 20 of the bipolar wall 18a. The separator 14 is then placed upon the negative electrode 16 within the cell cavity 28. Then, the positive electrode 12 is placed upon the separator 14 within the cell cavity 28. The felt gasket 26 in its uncompressed state is thicker than the cell components (i.e., the electrodes 12 and 16 and the separator 14) and is thus thicker than the cell will be once loaded.

Figure 3D:
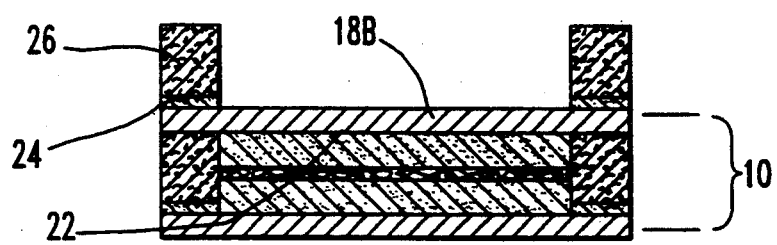
FIG. 3D is a cross sectional view taken in elevation of the fourth step of a first preferred method of forming the containment barrier as affixed to a stacked multicell battery.

Once the cell components 12, 14, 16 are placed within the cell cavity 28, bipolar wall 18b is placed upon the felt gasket 26 as shown in FIG. 3D forming a completed bipolar cell 10. The felt gasket 26 in its uncompressed state is thicker than the cell components (i.e., the electrodes 12 and 16 and the separator 14) and is thus thicker than the cell will be once loaded. Note that the bipolar walls 18a and 18b provides the boundary for the bipolar cell 10. Bipolar wall 18b will provide a boundary for the next cell that will be stacked upon cell 10. As the stack of bipolar cells is used in operation, each cell is compressively loaded so that each felt gasket 26 is compressed to the same thickness as the electrodes 12 and 16 and separator 14.

Figure 4A:
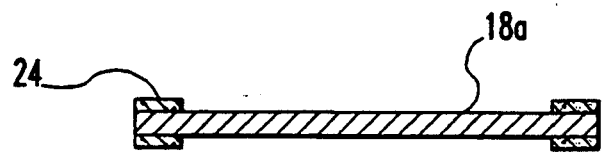
FIG. 4A is a cross sectional view taken in elevation of the first step of a second preferred method of forming the containment barrier as affixed to a stacked multicell battery.
Figure 4B:
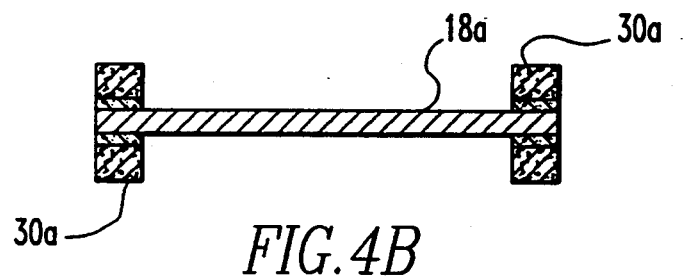
FIG. 4B is a cross sectional view taken in elevation of the second step of a second preferred method of forming the containment barrier as affixed to a stacked multicell battery.
Figure 4C:
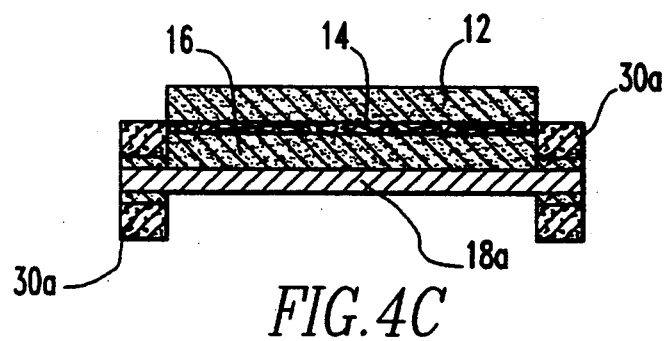
FIG. 4C is a cross sectional view taken in elevation of the third step of a second preferred method of forming the containment barrier as affixed to a stacked multicell battery.
Figure 4D:
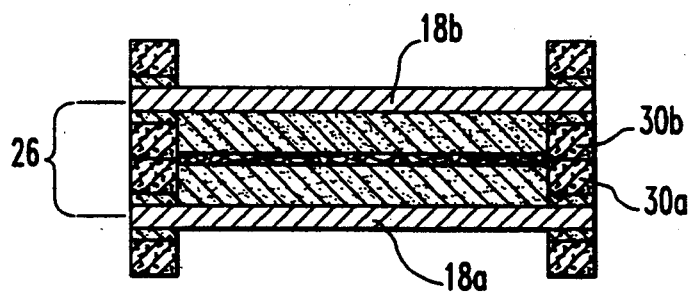
FIG. 4D is a cross sectional view taken in elevation of the fourth step of a second preferred method of forming the containment, barrier as affixed to a stacked multicell battery.

Although the containment barrier of the present application is preferably formed by the method depicted in the sequence of FIGS. 3A through 3D, the containment barrier may be formed by any convenient means. For example, a second preferred method of forming the barrier seal is depicted in FIGS. 4A through 4D. Referring first to FIG. 4A, a paintable cement 24 is applied to the distal edge 21 of both the top face 20 and the bottom face 22 of a first bipolar wall 18a. Portions or segments 30a of gasket 26 that are approximately one half the height of the final gasket 26 are then placed into adhering contact (by way of cement 24) with each of the upper surface 20 and the lower surface 22 of the bipolar wall 18a, as shown in FIG. 4B. The bipolar wall 18a with the two gasket segments 30a adhered thereto, may then be heated to remove volatile materials. As shown in FIG. 4C, the cell components 12, 14 and 16 are then placed upon the top surface 20 of the bipolar wall 18a. A second bipolar wall 18b also having two gasket segments 30b adhered thereto is then placed upon the first bipolar wall 18a and its gasket segments 30a. In this arrangement, the gasket segment 30a that is adhered to the top surface of the first bipolar wall 18a is aligned with and forms a complete gasket 26 with the gasket segment 30b adhered to the bottom surface 22 of the second bipolar wall 18b.

Although each gasket segment is preferably one half the height of the final gasket 26, mating gasket segments 30a, 30b need not be of the same height. Also, although each gasket segment is shown in FIGS. 4A through 4d to be continuous so as to extend completely around the cell components, the gasket segments may extend only partially around the cell components and come into mating contact to seal the cell components. Also, although two gasket segments are shown to mate and form each gasket 26, gasket 26 may be formed of any number of segments.

Variations of the preferred embodiment can be made. For example, for rectangular bipolar walls, the paintable cement is applied to a rectangular picture frame area and the felt gasket has a rectangular picture frame shape. However, the cement and gasket can be shaped to correspond to the periphery of a bipolar wall of any configuration.

While certain present preferred embodiments have been shown and described, it is distinctly understood that the invention is not limited thereto but may be otherwise embodied within the scope of the following claims.

I claim:

1. In an improved battery of the type formed of cells stacked in series, each cell having a positive electrode, a negative electrode and a separator, all three components contain an electrolyte, each cell being separated from an adjacent cell by a respective bipolar wall, such that selected cells are bounded by opposed planar faces of first and second bipolar walls, the improvement comprising:

a plurality of flexible sleeve-shaped boron nitride barrier seals, each barrier seal being provided peripherally around the electrodes of a respective cell, a first end of the barrier seal being in contact with the planar face of the first bipolar wall and a second end of the barrier seal being in contact with the opposed planar face of the second bipolar wall.

2. The battery of claim 1 wherein the barrier seal is continuous.

3. The battery of claim 1 wherein the barrier seal is comprised of at least two segments.

4. The battery of claim 1 wherein the boron nitride is fashioned as a felt gasket.

5. The battery of claim 1 wherein selected barrier seals are affixed to at least one of the opposed planar faces by a paintable cement.

6. The battery of claim 5 wherein the paintable cement is made of a nonwettable material.

7. The battery of claim 5 wherein the paintable cement is a mixture of boron nitride powder and a clay binder suspended in a nonaqueous organic vehicle.

8. The battery of claim 1 wherein the barrier seals are held in sealing contact with at least one of the bipolar walls by a compressive force applied to the battery.

9. A method of making a barrier seal for a battery, the battery being formed of cells stacked in series, each cell having a positive electrode and a negative electrode that both contain an electrolyte and are separated from one another by a separator that allows ions to pass between the electrodes without allowing electrode material to pass between the electrodes, the cells being separated from one another by a respective bipolar wall, wherein each cell is bounded by opposed planar faces of first and second bipolar walls, comprising the steps of:

(a) applying a cement to a distal edge of at least one of the opposed planar faces of selected bipolar walls; and (b) placing a sleeve-shaped barrier seal between each opposed planar faces of the bipolar walls, the barrier seal having a thickness such as to be in contact with the cement applied to the opposed planar faces of the bipolar walls, once in position.

10. The method of claim 9 further comprising the step of heating the bipolar wall and seal to at least 500° C.

11. The method of claim 9 wherein the seal is made of a flexible material.

12. The method of claim 11 wherein the seal is made of boron nitride.

13. The method of claim 9 wherein the paintable cement is made of a nonwettable material.

14. The method of claim 9 wherein the cement is a mixture of boron nitride powder and a clay binder suspended in a nonaqueous organic vehicle.

15. A method of making a barrier seal for a battery, the battery being formed of cells stacked in series, each cell having a positive electrode and a negative electrode that both contain an electrolyte and are separated from one another by a separator that allows ions to pass between the electrodes without allowing electrode material to pass between the electrodes, the cells being separated from one another by a respective bipolar wall, wherein each cell is bounded by opposed planar faces of first and second bipolar walls, comprising the steps of:

(a) applying a cement to a distal edge of a top planar face and a bottom planar face of selected bipolar walls;

(b) adhering at least one segment of a sleeve-shaped barrier seal to the top and bottom planar faces of selected bipolar walls; and (c) placing the at least one seal segment of a top planar face into mating contact with the at least one seal segment of a bottom planar face.

* * * * *